(12) United States Patent
Katukam et al.

(10) Patent No.: US 11,451,972 B2
(45) Date of Patent: Sep. 20, 2022

(54) METHODS AND SYSTEMS FOR AUTOMATIC NETWORK DESIGN

(71) Applicant: Nile Global, Inc., Cupertino, CA (US)

(72) Inventors: Suresh Katukam, Milpitas, CA (US); Vijay Bollapragada, Bangalore (IN); Arun Madupu, Bangalore (IN)

(73) Assignee: Nile Global, Inc., San Jose, CA (US)

( * ) Notice: Subject to any disclaimer, the term of this patent is extended or adjusted under 35 U.S.C. 154(b) by 103 days.

(21) Appl. No.: 17/134,035

(22) Filed: Dec. 24, 2020

(65) Prior Publication Data

US 2022/0210663 A1    Jun. 30, 2022

(51) Int. Cl.
| | | |
|---|---|---|
| *H04W 16/18* | (2009.01) | |
| *H04W 84/12* | (2009.01) | |
| *H04W 24/02* | (2009.01) | |
| *H04W 88/08* | (2009.01) | |
| *H04W 88/16* | (2009.01) | |

(52) U.S. Cl.
CPC ........... *H04W 16/18* (2013.01); *H04W 24/02* (2013.01); *H04W 84/12* (2013.01); *H04W 88/08* (2013.01); *H04W 88/16* (2013.01)

(58) Field of Classification Search
CPC ..... H04W 16/18; H04W 24/02; H04W 84/12; H04W 88/08; H04W 88/16
See application file for complete search history.

(56) References Cited

U.S. PATENT DOCUMENTS

| | | |
|---|---|---|
| 8,887,262 B1 | 11/2014 | Turner et al. |
| 9,173,115 B2 | 10/2015 | Sundareswaran et al. |
| 9,769,734 B2 | 9/2017 | Goto |
| 2014/0278281 A1 | 9/2014 | Vaynriber et al. |
| 2015/0172118 A1 | 6/2015 | Lin |
| 2017/0374560 A1 | 12/2017 | Judge et al. |
| 2018/0067593 A1* | 3/2018 | Tiwari ................... G08B 13/22 |
| 2018/0120973 A1 | 5/2018 | Tiwari et al. |
| 2018/0121571 A1* | 5/2018 | Tiwari ................... G06F 30/13 |

* cited by examiner

*Primary Examiner* — Mohammad S Anwar
(74) *Attorney, Agent, or Firm* — Loza & Loza, LLP

(57) ABSTRACT

Embodiments of a device and method are disclosed. In an embodiment, a method of automatic network design involves at a cloud server, obtaining site survey result information of a customer site and at the cloud server, determining a network design for a network to be deployed at the customer site based on the site survey result information, prior to deploying the network to be deployed at the customer site, where the network design includes a Bill of Materials (BoM) and a connectivity map for the network to be deployed at the customer site.

12 Claims, 7 Drawing Sheets

---

At a cloud server, obtain site survey result information of a customer site ~ 602

At the cloud server, determine a network design for a network to be deployed at the customer site based on the site survey result information, prior to deploying the network to be deployed at the customer site, where the network design includes a Bill of Materials (BoM) and a connectivity map for the network to be deployed at the customer site ~ 604

METHODS AND SYSTEMS FOR AUTOMATIC NETWORK DESIGN

BACKGROUND

Network design for a network, for example, an enterprise network, typically involves a manual and lengthy process at a customer site. For example, generating Bill of Materials (BoM) (e.g., a list of network elements) of a network at a customer site typically involves manually determining required network elements for the network. In addition, network topology discovery for a network at a customer site typically takes place after the deployment of the network at the customer site. For example, the topology and connectivity of a network can be discovered using a protocol such as Link Layer Discovery Protocol (LLDP) after the network is deployed at a customer site. Therefore, there is a need for network technology that can automate network design and generate the BoM and topology map for a network at a customer site prior to deploying the network at the customer site.

SUMMARY

Embodiments of a device and method are disclosed. In an embodiment, a method of automatic network design involves at a cloud server, obtaining site survey result information of a customer site and at the cloud server, determining a network design for a network to be deployed at the customer site based on the site survey result information, prior to deploying the network to be deployed at the customer site, where the network design includes a BoM and a connectivity map for the network to be deployed at the customer site.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
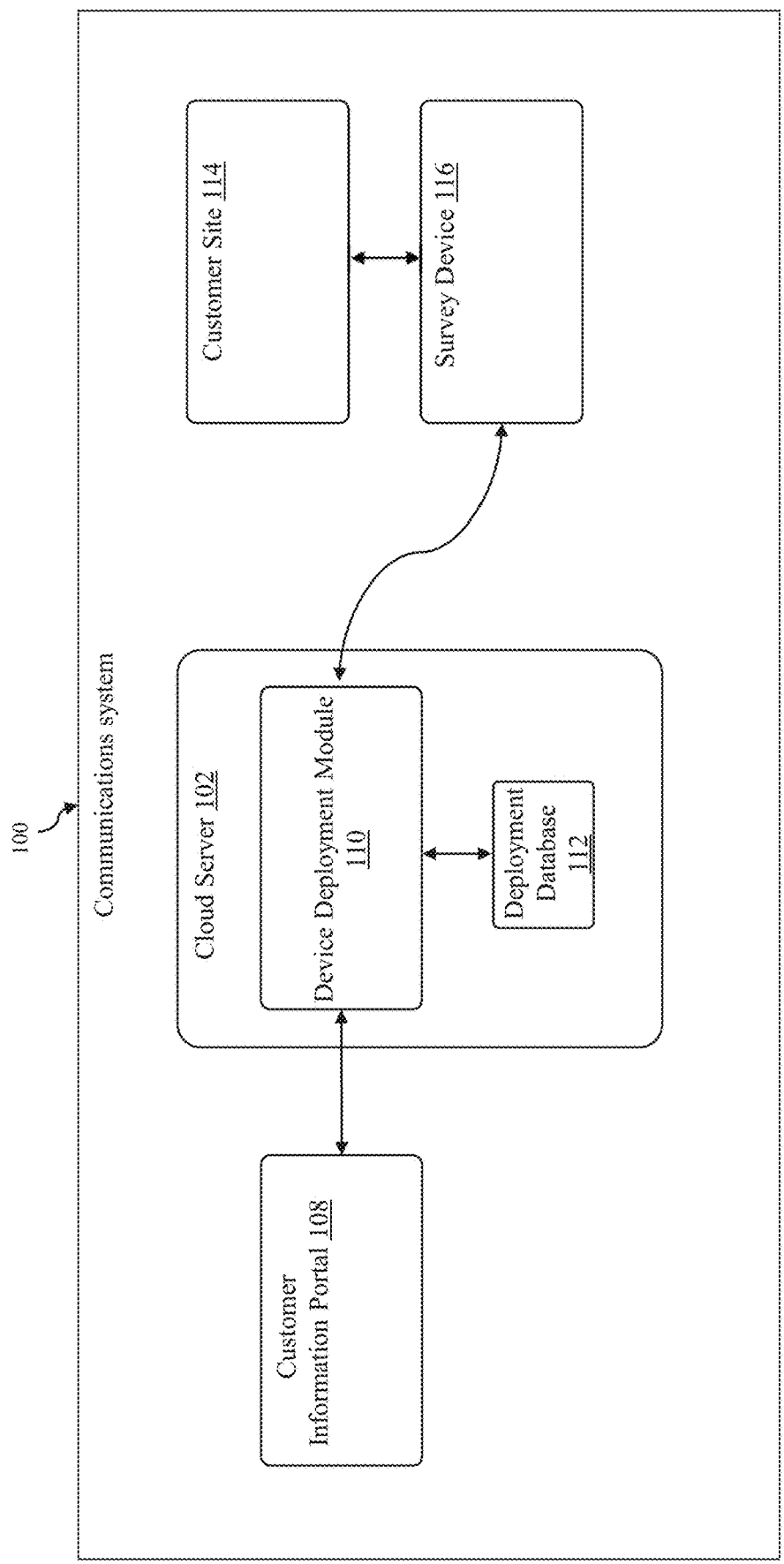
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102, a customer site 114, a survey device 116, and an optional customer information portal 108. The cloud server, the survey device, and/or the customer information portal may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one customer site, more than one survey device, and/or more than one customer information portal. In another example, although the cloud server, the customer site, the survey device, and the customer information portal are shown in FIG. 1 as being connected in certain topology, the network topology of the communications system 100 is not limited to the topology shown in FIG. 1.

The cloud server 102 can be used to provide at least one service to the customer site 114. For example, in some embodiments, the cloud server is configured to perform automatic network design for a network to be deployed or installed at the customer site 114. In the embodiment depicted in FIG. 1, the cloud server 102 includes a device deployment module 110 configured to perform automatic network design for a network at the customer site 114 and a deployment database 112 configured to store deployment data, for example, a Bill of Materials (BoM) and a connectivity map for a network to be deployed at the customer site. The cloud server may be implemented in hardware (e.g., circuits), software, firmware, or a combination thereof. In some embodiments, the cloud server is constructed on a server grade hardware platform, such as an x86 architecture platform. For example, the hardware platform of the cloud server may include conventional components of a computing device, such as one or more processors (e.g., CPUs), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations and other data.

The customer site 114 may include one or more buildings, and each building may include one or more floors. A network that can be deployed at the customer site may include any type of suitable network device or devices. A network device that can be deployed or installed at the customer site may be fully or partially implemented as an Integrated Circuit (IC) device. In some embodiments, a network device to be deployed at the customer site is a wired and/or wireless communications device that includes at least one processor (e.g., a microcontroller, a digital signal processor (DSP), and/or a central processing unit (CPU)), at least one wired or wireless communications transceiver implemented in one or more logical circuits and/or one or more analog circuits, at least one wired or wireless communications interface and that supports at least one wired or wireless communications protocol, and/or at least one antenna. For example, a network device to be deployed at the customer site may be compatible with Institute of Electrical and Electronics Engineers (IEEE) 802.3 protocol and/or one or more wireless local area network (WLAN) communications protocols, such as IEEE 802.11 protocol. In some embodiments, a network device to be deployed at the customer site is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as IEEE 802.11 protocol. In some embodiments, a network device to be deployed at the customer site is a wireless station (STA) that wirelessly connects to a wireless AP. For example, the network device may be a laptop, a desktop personal computer (PC), a mobile phone, or other wireless device that supports at least one WLAN communications protocol (e.g., IEEE 802.11)). In some embodiments, a network device to be deployed at the customer site is a wired communications device that is compatible with at least one wired local area network (LAN) communications protocol, such as a wired router (e.g., an Ethernet router), a wired switch, a wired hub, or a wired bridge device (e.g., an Ethernet bridge).

The survey device 116 may be any type of suitable network device that is used by a technician to facilitate network design for the customer site 114. The survey device may be fully or partially implemented as an IC device. In some embodiments, the survey device is a computing device that includes at least one processor (e.g., a microcontroller, a DSP, and/or a CPU), at least one communications transceiver, and at least one communications interface and that supports at least one communications protocol. For example, the survey device is a wireless communications device that includes at least one wireless communications transceiver, at least one wireless communications interface, and/or at least one antenna and that supports at least one wireless communications protocol. In some embodiments, the survey device is a handheld wireless device, such as a cellular phone or a mobile phone (e.g., a smart phone), a pad computer, a Personal Digital Assistant (PDA) etc. that supports one or more radio frequency (RF) communications protocol, including without limitation, the Global System for Mobile Communications (GSM), Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE), the fifth generation technology standard for broadband cellular network (5G), and IEEE 802.16 standards bodies and/or one or more wireless local area network (WLAN) communications protocols, such as IEEE 802.11 protocol. In some embodiments, site survey software (e.g., a commonly used Wi-Fi design and spectrum analysis software or App) is installed on the survey device (e.g., a mobile phone or tablet). In some embodiments, the survey device may include a special-purpose device (e.g., a spectrum analyzer device) configured to measure the wireless signal strength at the customer site.

The customer information portal 108, which may be optional to the communications system 100, is configured to receive customer information. In some embodiments, the customer information portal includes a user interface that allows a customer to input information associated with network design for the customer site 114, such as one or more specific requirements or restrictions. For example, the user interface (e.g., a graphical user interface (GUI)) may allow a customer to input information associated with network design for the customer site. The customer information portal may be implemented in hardware (e.g., circuits), software, firmware, or a combination thereof.

Figure 2:
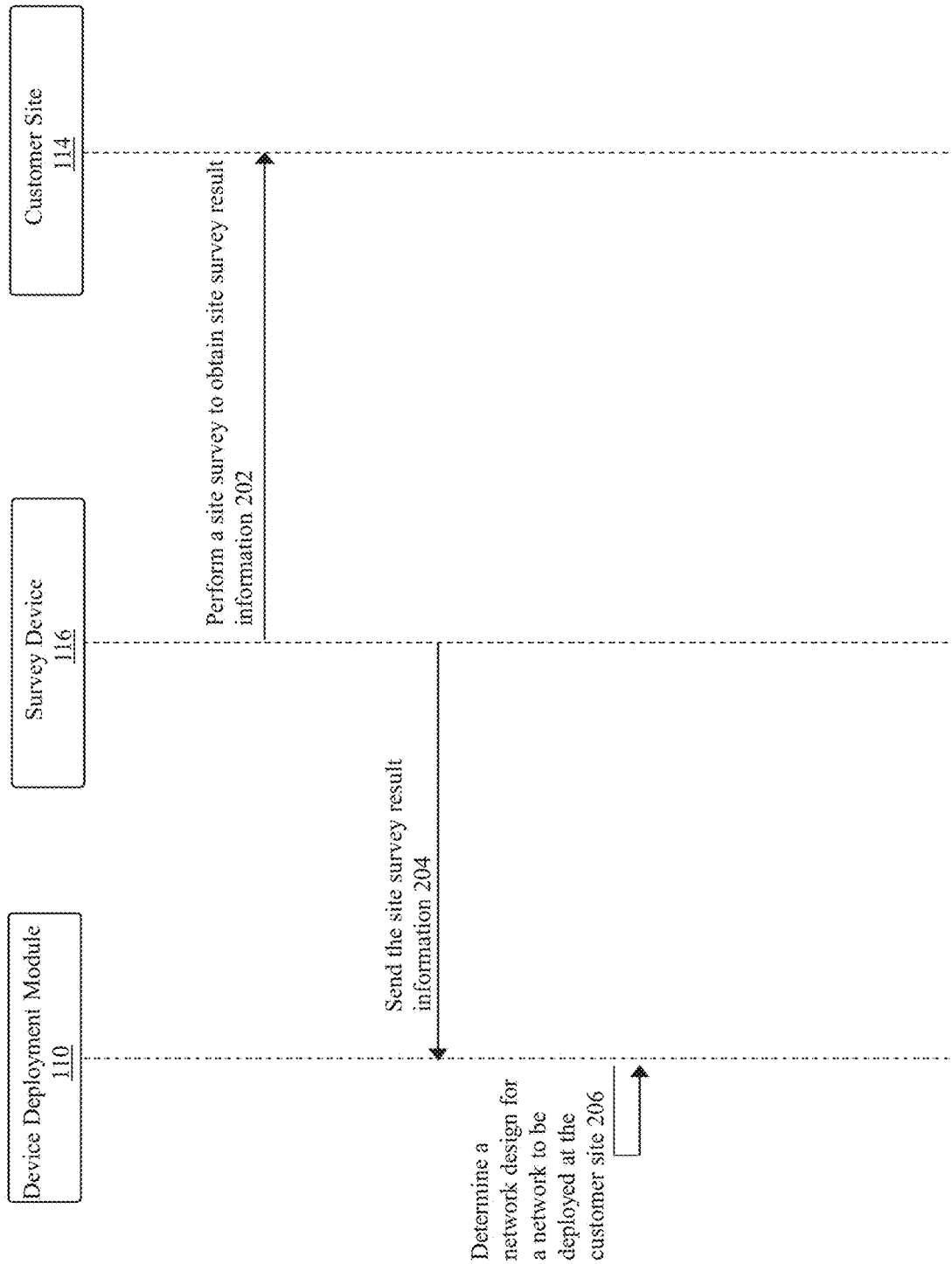
FIG. 2 shows a swim-lane diagram illustrating an example procedure for automatic network design in the communications system depicted in FIG. 1.

FIG. 2 shows a swim-lane diagram illustrating an example procedure for automatic network design in the communications system 100 depicted in FIG. 1. In this automatic network design procedure, a network design for the customer site 114 is automatically generated by the device deployment module 110 of the cloud server 102, based on survey results of the customer site that are collected via the survey device 116. In operation 202, a technician uses the survey device 116 to perform a site survey at the customer site 114 to obtain site survey result information. In some embodiments, the technician uses information in a mobile app installed in the survey device to perform a site survey at the customer site. For example, the survey device is a handheld wireless device, such as a cellular phone or a mobile phone (e.g., a smart phone), a pad computer, a PDA etc., and the mobile app is a mobile application from an application store (e.g., Android Market, Apple App Store, Amazon Appstore, carrier applications stores, etc.). In some embodiments, a technician uses the survey device 116 to perform a site survey at the customer site based on customer wired and/or wireless requirements. In some embodiments, the site survey result information includes wired connectivity information for the customer site, such as the number of wired port(s) to be installed at the customer site, type of wired port(s) (e.g., power over ethernet (PoE) vs. non-PoE) to be installed at the customer site, and/or the location(s) of port(s) to be installed at the customer site at the customer site, and wireless connectivity information for the customer site, such as the number of wireless APs to be installed at the customer site to deliver the coverage and capacity required for the customer site. In some embodiments, the survey device 116 is configured to identify the location and the number of wired port(s) to be installed at the customer site on a per floor basis, to identify if there is enough power outlet(s) and rack space(s) available to deploy network device(s), to identify an optimal number of wireless AP(s) to be installed at the customer site and location(s) on a per floor basis to meet the coverage and capacity requirements of the customer site, and/or to identify any co-channel interference between wireless APs.

Figure 3:
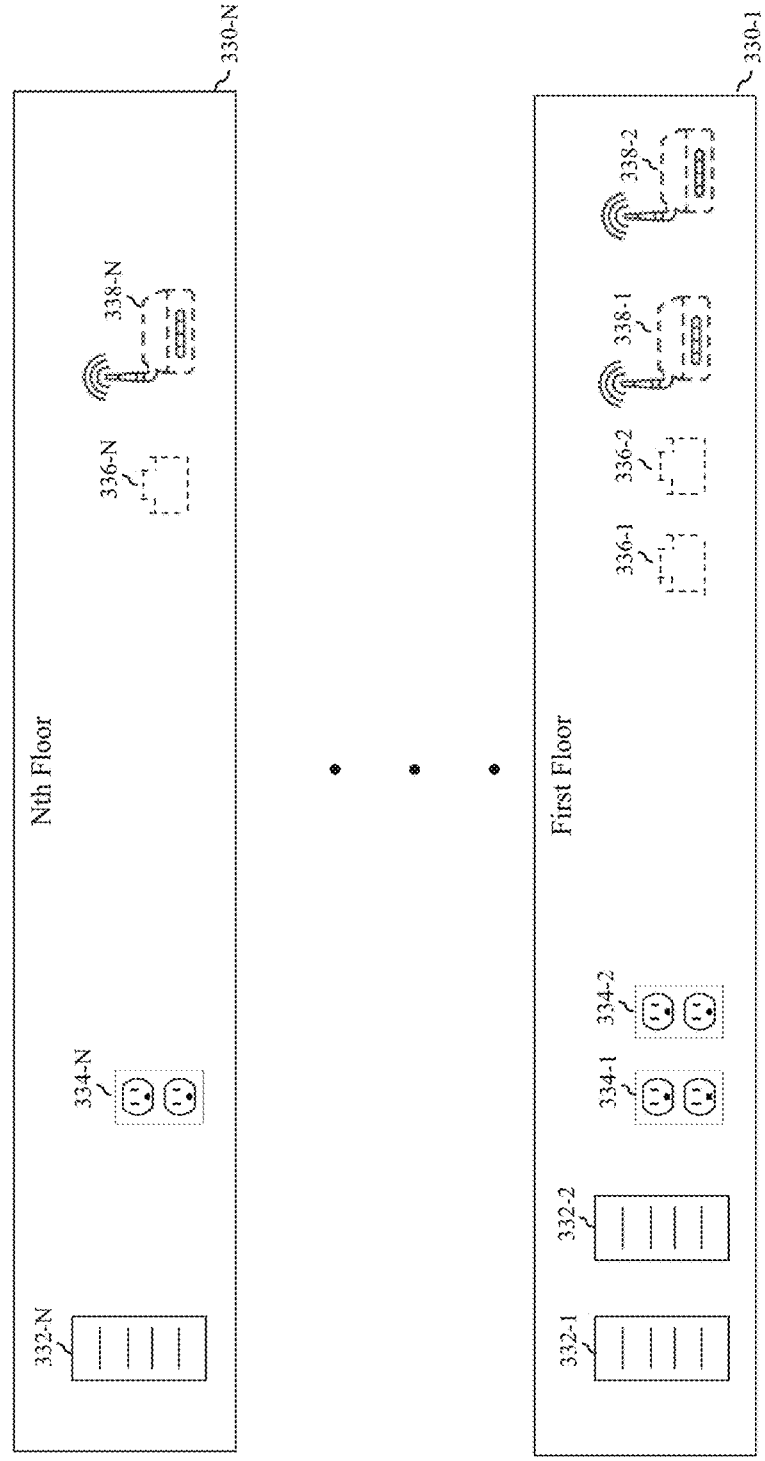
FIG. 3 depicts an embodiment of a site survey result for a customer site.

FIG. 3 depicts an embodiment of a site survey result for a customer site 314. The customer site 314 depicted in FIG. 3 is an embodiment of the customer site 114 depicted in FIG. 1. However, the customer site 114 depicted in FIG. 1 is not limited to the embodiment shown in FIG. 3. In the embodiment depicted in FIG. 3, the customer site 314 includes a number of floors, 330-1, . . . , 330-N, where N is an integer that is greater than zero. In some embodiments, the survey device 116 is configured to identify the number of available power outlet(s) and rack space(s) for each floor of the customer site 314, to identify the location and the number of wired port(s) to be installed at each floor of the customer site 314, to identify the number of wireless AP(s) to be installed at each floor of the customer site 314, and/or to identify any co-channel interference between wireless APs. In the network design depicted in FIG. 3, in the first floor 330-1 of the customer site 314, the survey device identifies two device racks 332-1, 332-2 and two power outlets 334-1, 334-2 that are available at the first floor 330-1 and two wired ports (e.g., Ethernet ports) 336-1, 336-2 and two wireless APs 338-1, 338-2 to be installed at the first floor 330-1. In the Nth floor 330-N of the customer site 314, the survey device identifies one device rack 332-N and one power outlet 334-N that are available at the Nth floor 330-N and one wired port (e.g., an Ethernet port) 336-N and one wireless AP 338-N to be installed at the Nth floor 330-N.

Figure 4:
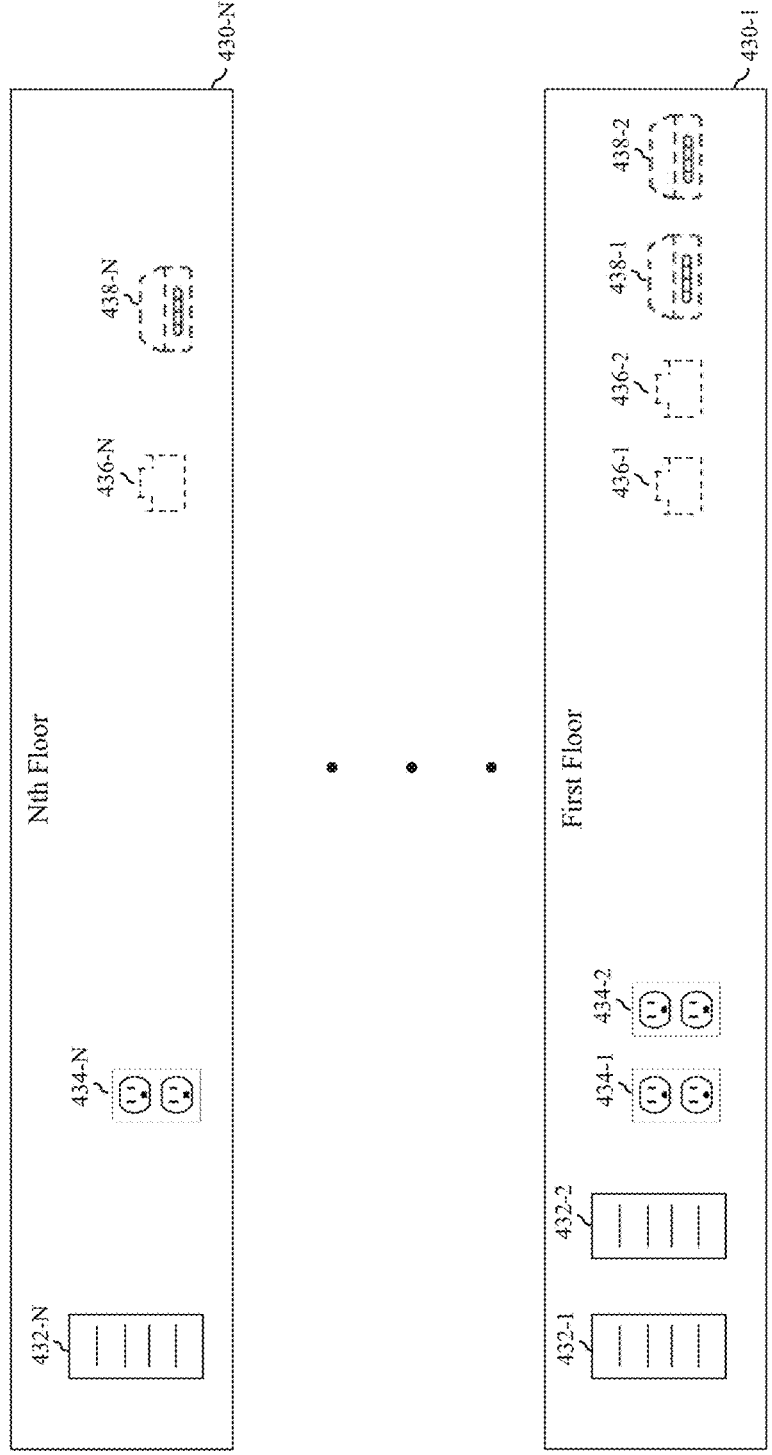
FIG. 4 depicts an embodiment of a site survey result for a customer site.

FIG. 4 depicts an embodiment of a site survey result for a customer site 414. The customer site 414 depicted in FIG. 4 is an embodiment of the customer site 114 depicted in FIG. 1. However, the customer site 114 depicted in FIG. 1 is not limited to the embodiment shown in FIG. 4. In the embodiment depicted in FIG. 4, the customer site 414 includes a number of floors, 430-1, . . . , 430-N, where N is an integer that is greater than zero. In some embodiments, the survey device 116 is configured to identify the number of available power outlet(s) and rack space(s) for each floor of the customer site 414, to identify the location and the number of wired port(s) to be installed at each floor of the customer site 414, to identify the number of wired network devices and/or wireless AP(s) to be installed at each floor of the customer site 414, and/or to identify any co-channel interference between wireless APs. In the network design depicted in FIG. 4, in the first floor 430-1 of the customer site 414, the survey device identifies two device racks 432-1, 432-2 and two power outlets 434-1, 434-2 that are available at the first floor 430-1 and two wired ports (e.g., Ethernet ports) 436-1, 436-2 and two wired devices 438-1, 438-2, which may be wired routers (e.g., Ethernet routers), wired switches (e.g., Ethernet switches), or wired bridge devices (e.g., Ethernet bridges) to be installed at the first floor 430-1. In the Nth floor 430-N of the customer site 414, the survey device identifies one device rack 432-N and one power outlet 434-N that are available at the Nth floor 430-N and one wired port (e.g., an Ethernet port) 436-N and a wired device 438-N, which may be a wired router (e.g., an Ethernet router), a wired switch (e.g., an Ethernet switch), or a wired bridge device (e.g., an Ethernet bridge), to be installed at the Nth floor 430-N.

Turning back to the swim-lane diagram shown in FIG. 2, in operation 204, the survey device 116 transmits the survey result information of the customer site 114 to the device deployment module 110 of the cloud server 102. The site survey result information may include wired connectivity information for the customer site, such as the number of wired port(s), type of wired port(s) (e.g., power over ethernet (PoE) vs. non-PoE), and/or the location(s) of port(s) available at the customer site and/or to be newly installed at the customer site, and/or wireless connectivity information for the customer site, such as the number of wireless APs available at the customer site and/or to be newly installed at the customer site to deliver the coverage and capacity required for the customer site. In some embodiments, the survey result information of the customer site 114 includes the location and the number of wired port(s) needed for the customer site on a per floor basis, whether or not there is enough power outlet(s) and rack space(s) available to deploy network device(s), an optimal number of wireless AP(s) to be installed and location(s) on a per floor basis to meet the coverage and capacity requirements of the customer site, and/or any co-channel interference between wireless APs. In some embodiments, the survey device transmits the survey result information of the customer site 114 from a mobile app installed in the survey device to the device deployment module 110.

In operation 206, the device deployment module 110 of the cloud server 102 determines a network design for a network to be deployed at the customer site 114 based on the survey result information received from the survey device 116. In some embodiments, the network design includes a Bill of Materials (BoM) and a connectivity map for the network to be deployed at the customer site. In some embodiments, the device deployment module is configured to automatically generate the list of network elements for the customer site 114 using a standardized network block that includes a specific combination of network devices. In an embodiment, a customer network may be designed as a set of standardized network blocks, which are also referred to as network service blocks (NSBs). In an embodiment, an NSB is the foundational building block for network design and is replicable. The standardization of an NSB reduces the complexity in the network design and, hence makes the network design and BoM generation automatable. In some embodiments, once the BoM for a network to be deployed at the customer site is generated, the device deployment module is configured to automatically generate a connectivity map that defines how network elements in the BoM are connected to each other. In some embodiments, the automatic generation of a connectivity map is enabled by building rules using a reference topology that defines how network elements connect to each other and network ports to be used by the network elements (i.e., allowed ports) for the connectivity. For example, a specific device (e.g., a network switch) may include a first set of ports (e.g., 1-24) that are of a first type (e.g., 10/25GE Small Form-Factor Pluggable (SFP)28, 10/25GE SFP28 or 100G Quad Small Form-Factor Pluggable (QSFP)28) and are used to connect the specific device with a first sets of network devices (e.g., APs and wired routers) and a second set of ports (e.g., 25-28) that are of a second type (e.g., 10/25GE Small Form-Factor Pluggable (SFP)28, 10/25GE SFP28 or 100G Quad Small Form-Factor Pluggable (QSFP)28) and are used to connect the specific device with a second sets of network devices (e.g., access switches). However, the number and types of ports that a network device can have are not limited to the examples described.

Figure 5:
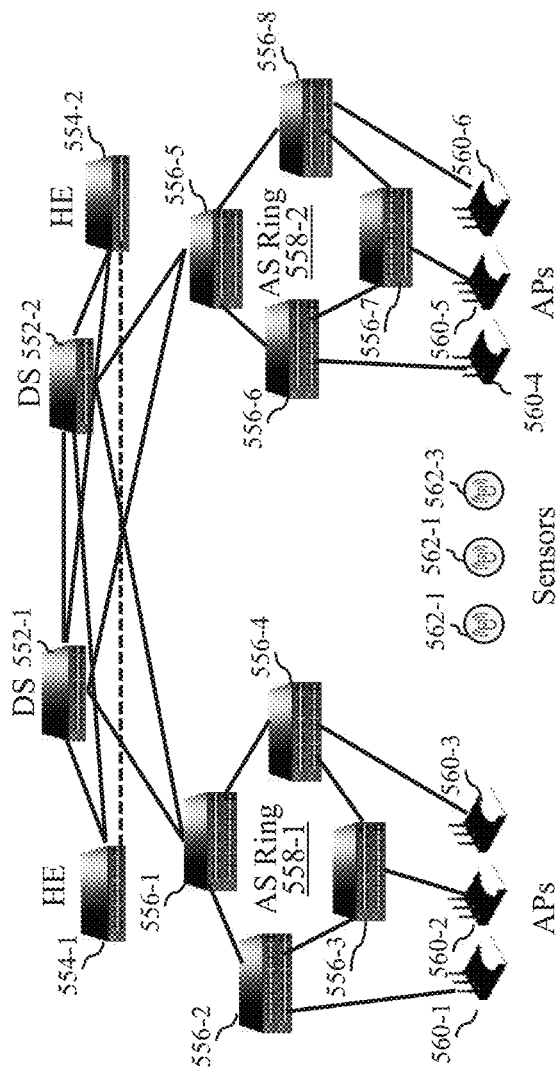
FIG. 5 depicts an embodiment of a network service block (NSB) for a customer site.

FIG. 5 depicts an embodiment of an NSB 550 for the customer site 114. The NSB 550 depicted in FIG. 5 is one possible embodiment of standardized network deployment blocks that can be used in the customer site 114 depicted in FIG. 1. However, standardized network deployment blocks that can be used in the customer site 114 depicted in FIG. 1 are not limited to the embodiment shown in FIG. 5. In some embodiments, the NSB 550 is a basic building block for providing connectivity as a service and is a replicable block that can be scaled (e.g., expanded) to meet any deployment. In the embodiment depicted in FIG. 5, the NSB 550 includes a pair of distribution switches (DSs) or distribution layer switches 552-1, 552-2 that are aggregation switches functioning as a bridge between core layer switches and access layer switches, a pair of head ends (HEs) or gateways 554-1, 554-2, a number of access switches (ASs) 556-1, 556-2, 556-3, 556-4, 556-5, 556-6, 556-7, 556-8 connected in rings 558-1, 558-2 that directly interact with lower level devices (e.g., wireless APs), a number of wireless APs 560-1, 560-2, 560-3, 560-4, 560-5, 560-6 connected to the ASs, and a number of wireless sensors 562-1, 562-2, 562-3 that wirelessly connect to the wireless APs. In some embodiments, the number of HEs and DSs is constant in the NSB 550 while the number of the wireless APs, the ASs and the sensors varies. The topology of the NSB remains the same and is standardized.

Turning back to the swim-lane diagram shown in FIG. 2, in an example operation, a technician uses the survey device 116 (e.g., a mobile phone or tablet) to conduct a wired survey and a wireless survey at the customer site 114. Before the technician performs the survey at the customer site, the floor plan of the customer site, which may be in Portable Document Format (PDF), Joint Photographic Experts Group (JPEG), Portable Network Graphics (PNG), AUTOCAD, or other suitable format, is delivered to the survey device. During the wired survey, the technician may ask a customer where in the floor plan wired ports (e.g., Ethernet ports or PoE ports) are to be installed, annotate the floor plan with locations of wired ports that are available at the customer site and/or to be newly installed at the customer site, and input information (e.g., the number of wired ports per floor, how many wired ports are of a particular type (e.g., PoE ports), how much the power budget per port is, how many ports are non-PoE wired ports, the location of an intermediate distribution frame (IDF) or a closet in which network elements are be to placed, and/or how much power capacity is available at the customer site) in a mobile app installed at the survey device (e.g., a mobile phone or tablet). During the wireless survey step, the technician may use a site survey software (e.g., a commonly used Wi-Fi design and spectrum analysis software or App) installed at the survey device (e.g., a mobile phone or tablet) or use a special-purpose device (e.g., a spectrum analyzer device) to load the floor plan of the customer site while walking in or around the customer site. The technician uses the site survey software installed on the survey device and/or a special-purpose device (e.g., a spectrum analyzer device) to measure the wireless signal strength at each location of the floor plan. In some embodiments, the survey device (e.g., the site survey software installed in the survey device) recommends a network deployment arrangement (e.g., the number of wireless APs to be installed, the locations at which wireless APs are installed, and channel plan recommendation to avoid channel overlaps between adjacent wireless APs) based on the capacity and coverage requirements of the customer. The result data from the wired survey and the wireless survey are transmitted from the survey device (e.g., a mobile App installed on the survey device) to the device deployment module 110, which in turn generates the BoM or the number and configuration of NSBs for network device deployment.

After the device deployment module 110 of the cloud server 102 determines the network design for a network to be deployed at the customer site 114, the network is deployed (e.g., the network devices including switches, routers, hubs, and/or wireless APs are installed) at the customer site 114 based on the network design (e.g., the BoM and the connectivity map). In some embodiments, a list of device(s) with specific device type(s) and specific location(s) in floor plan(s) are installed at the customer site 114 based on the network design.

Network design for a network, for example, an enterprise network, typically involves a manual and lengthy process at a customer site. For example, generating a BoM for a network to be deployed at a customer site typically involves manually determining required network elements for the network. However, a manual process is error prone and can lead to incorrect BoM data. In addition, network topology design for a network at a customer site typically takes place after the network is installed at the customer site. Compared to manually determining BoM data (e.g., required network elements) for a network to be deployed at a customer site, the device deployment module 110 of the cloud server 102 can automatically determine a BoM for a network at a customer site (e.g., the customer site 114). Based on survey result information from the survey device 116, which may include wired connectivity information for a customer site, such as the number of wired port(s), type of wired port(s) (e.g., power over ethernet (PoE) vs. non-PoE), and/or the location(s) of port(s) at the customer site, and/or wireless connectivity information for the customer site, such as the number of wireless APs required to deliver the coverage and capacity required for the customer site, the device deployment module 110 can automatically determine a BoM for a network to be deployed at the customer site. Consequently, network design efficiency and accuracy can be improved. In addition, compared to designing network topology for a network at a customer site after the network is installed at the customer site, the device deployment module 110 can automatically generate a topology map for a network at a customer site prior to deploying the network at the customer site. Consequently, time required for network design for a customer site can be shortened or reduced.

Figure 6:
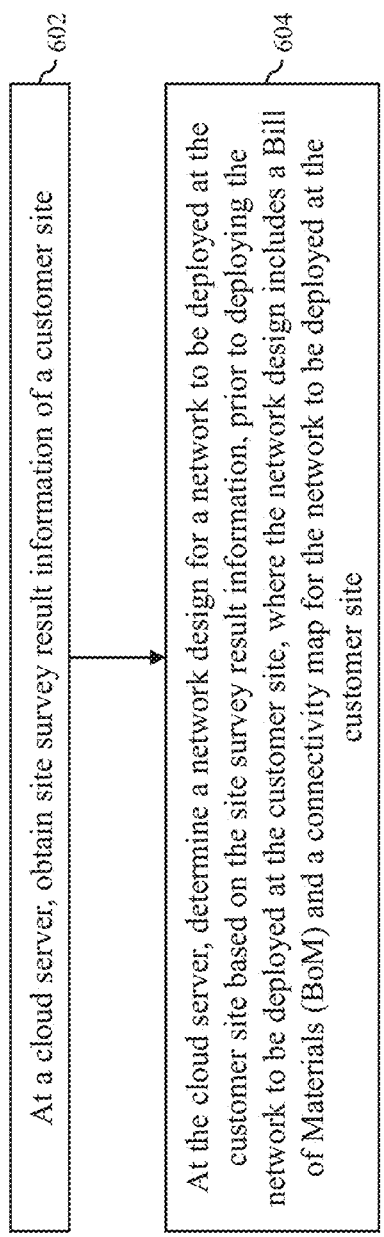
FIG. 6 is a process flow diagram of a method for automatic network design in accordance to an embodiment of the invention.

FIG. 6 is a process flow diagram of a method for automatic network design in accordance to an embodiment of the invention. According to the method, at block 602, at a cloud server, site survey result information of a customer site is obtained. At block 604, at the cloud server, a network design for a network to be deployed at the customer site is determined based on the site survey result information, prior to deploying the network to be deployed at the customer site, where the network design includes a Bill of Materials (BoM) and a connectivity map for the network to be deployed at the customer site. The operations 602, 604 in the flow diagram of FIG. 6 may correspond to the operations 204, 206 in the swim-lane diagram of FIG. 2. The customer site may be similar to, the same as, or a component of the customer site 114 depicted in FIG. 1.

Figure 7:
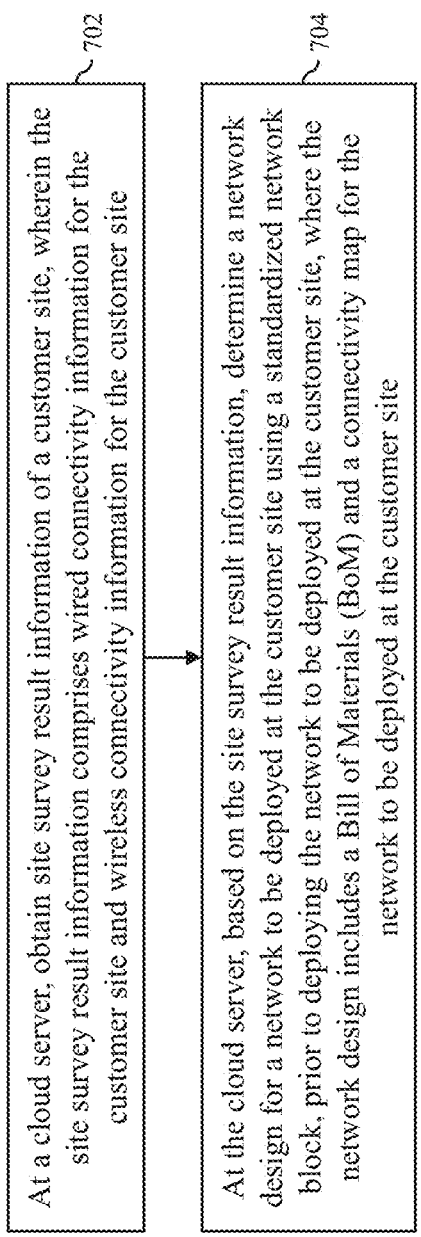
FIG. 7 is a process flow diagram of a method for automatic network design in accordance to another embodiment of the invention.

FIG. 7 is a process flow diagram of a method for automatic network design in accordance to another embodiment of the invention. According to the method, at block 702, at a cloud server, site survey result information of a customer site, which includes wired connectivity information for the customer site and wireless connectivity information for the customer site, is obtained. At block 704, at the cloud server, based on the site survey result information, a network design for a network to be deployed at the customer site is determined using a standardized network block, prior to deploying the network to be deployed at the customer site, where the network design includes a Bill of Materials (BoM) and a connectivity map for the network to be deployed at the customer site. The operations 702, 704 in the flow diagram of FIG. 7 may correspond to the operations 204, 206 in the swim-lane diagram of FIG. 2. The customer site may be similar to, the same as, or a component of the customer site 114 depicted in FIG. 1. The standardized network block may be similar to, the same as, or a component of the NSB 550 depicted in FIG. 5.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for automatic network design, the method comprising:
at a cloud server, obtaining site survey result information of a customer site; and
at the cloud server, determining a network design for a network to be deployed at the customer site using a network deployment block based on the site survey result information, prior to deploying the network to be deployed at the customer site, wherein the network design includes a Bill of Materials (BoM) and a connectivity map for the network to be deployed at the customer site, and wherein the network deployment block comprises:
a pair of distribution switches;
a pair of gateways that are connected to the pair of distribution switches;
a plurality of access switches that are connected to the pair of distribution switches;
a plurality of wireless access points (APs) that are connected to the distribution switches through the access switches; and
a plurality of wireless sensors that wirelessly connect to the wireless APs.

2. The method of claim 1, wherein the site survey result information comprises wired connectivity information for the customer site.

3. The method of claim 1, wherein the site survey result information comprises wireless connectivity information for the customer site.

4. The method of claim 1, wherein the site survey result information comprises:
locations and a number of wired ports to be installed at the customer site on a per floor basis;
available power outlet and rack space information at the customer site on a per floor basis;
locations and a number of wireless APs to be installed at the customer site on a per floor basis; and
channel interference information between wireless APs.

5. The method of claim 1, wherein at the cloud server, determining the BoM and the connectivity map for the network to be deployed at the customer site based on the site survey result information, prior to deploying the network to be deployed at the customer site comprises at the cloud server, once the BoM for the network to be deployed at the customer site is generated, automatically generating the connectivity map that defines how network elements in the BoM is connected to each other.

6. The method of claim 1, wherein the network is installed at the customer site based on the network design.

7. A system for automatic network design, the system comprising:
a device deployment module is configured to:
obtain site survey result information of a customer site; and
determine a network design for a network to be deployed at the customer site using a network deployment block based on the site survey result information, prior to deploying the network to be deployed at the customer site, wherein the network design includes a Bill of Materials (BoM) and a connectivity map for the network to be deployed at the customer site, and wherein the network deployment block comprises:
- a pair of distribution switches;
- a pair of gateways that are connected to the pair of distribution switches;
- a plurality of access switches that are connected to the pair of distribution switches;
- a plurality of wireless access points (APs) that are connected to the distribution switches through the access switches; and
- a plurality of wireless sensors that wirelessly connect to the wireless APs; and a deployment database connected to the device deployment module and configured to store the BoM and the connectivity map for the network to be deployed at the customer site.

8. The system of claim 7, wherein the site survey result information comprises wired connectivity information for the customer site.

9. The system of claim 7, wherein the site survey result information comprises wireless connectivity information for the customer site.

10. The system of claim 7, wherein the site survey result information comprises:
- locations and a number of wired ports to be installed at the customer site on a per floor basis;
- available power outlet and rack space information at the customer site on a per floor basis;
- locations and a number of wireless APs to be installed at the customer site on a per floor basis; and
- channel interference information between wireless APs.

11. The system of claim 7, wherein the device deployment module is further configured to, once the BoM for the network to be deployed at the customer site is generated, automatically generate the connectivity map that defines how network elements in the BoM is connected to each other.

12. A method for automatic network design, the method comprising:
- at a cloud server, obtaining site survey result information of a customer site, wherein the site survey result information comprises wired connectivity information for the customer site and wireless connectivity information for the customer site; and
- at the cloud server, based on the site survey result information, determining a network design for a network to be deployed at the customer site using a network deployment block, prior to deploying the network to be deployed at the customer site, wherein the network design includes a Bill of Materials (BoM) and a connectivity map for the network to be deployed at the customer site, and wherein the network deployment block comprises:
    - a pair of distribution switches;
    - a pair of gateways that are connected to the pair of distribution switches;
    - a plurality of access switches that are connected to the pair of distribution switches;
    - a plurality of wireless access points (APs) that are connected to the distribution switches through the access switches; and
    - a plurality of wireless sensors that wirelessly connect to the wireless APs.

* * * * *